United States Patent [19]

Yamagushi et al.

[11] Patent Number: 5,668,076
[45] Date of Patent: Sep. 16, 1997

[54] PHOTOCATALYST AND METHOD FOR PREPARING THE SAME

[75] Inventors: Yasuhide Yamagushi; Masatoshi Yamazaki, both of Ageo; Akira Fujishima; Kazuhito Hashimoto, both of Kanagawa, all of Japan

[73] Assignee: Mitsui Mining Smelting Co., Ltd. et al., Tokyo, Japan

[21] Appl. No.: 429,345

[22] Filed: Apr. 26, 1995

[30] Foreign Application Priority Data

Apr. 26, 1994 [JP] Japan .................. 6-088436
Jun. 21, 1994 [JP] Japan .................. 6-138430

[51] Int. Cl.$^6$ .................................................. B01J 23/06
[52] U.S. Cl. ............................................................ 502/343
[58] Field of Search ............................................. 502/343

[56] References Cited

U.S. PATENT DOCUMENTS

| | | | |
|---|---|---|---|
| 4,869,792 | 9/1989 | Geus et al. | 204/96 |
| 4,954,465 | 9/1990 | Kawashima et al. | 62/264 |
| 4,955,208 | 9/1990 | Kawashima et al. | 62/264 |
| 5,256,616 | 10/1993 | Heller et al. | 502/350 |

FOREIGN PATENT DOCUMENTS

| | | | |
|---|---|---|---|
| 0 551 100 A1 | 3/1991 | European Pat. Off. | C04B 35/46 |
| 0 473 347 A1 | 3/1992 | European Pat. Off. | C04B 35/46 |
| 0 412 440 A2 | 7/1993 | European Pat. Off. | C04B 35/46 |
| 01 234 358 | of 0000 | Japan | C04B 35/46 |
| 06 076 627 | of 0000 | Japan | C04B 35/46 |
| 2-169673 | 6/1990 | Japan | C09D 5/00 |
| 3-8448 | 1/1991 | Japan | B01J 35/02 |
| 5-140331 | 8/1993 | Japan | C08J 5/00 |
| 2 068 931 | 2/1980 | United Kingdom | C04B 35/46 |

OTHER PUBLICATIONS

Derwent Publications Ltd., abstract for JP-A-57 040 806, 6 Mar. 1982.
Derwent Publications Ltd., abstract for JP-A-03 295 854, 26 Dec. 1991.
Derwent Publications Ltd., abstract for JP-A-05 334 914.
Communication and Search Report for EP 9511 3625.8 dated Jan. 12, 1996.
English language abstract for 2-169673.
English language abstract for 3-8448.
English language abstract for 5-140331.

*Primary Examiner*—Glenn A. Caldarola
*Assistant Examiner*—Alexander G. Gmyka
*Attorney, Agent, or Firm*—Kane, Dalsimer, Sullivan, Kurucz, Levy, Eisele and Richard, LLP

[57] ABSTRACT

A photocatalyst comprises, on the surface, a zinc oxide film which comprises zinc oxide fine particles formed by anodic oxidation of zinc and having a particle size of not more than 0.2 μm and a method for preparing a photocatalyst comprises the step of anodically oxidizing the surface of a zinc metal substance or a substance mainly comprising zinc metal to form, on the surface, a zinc oxide film which comprises zinc oxide fine particles having a particle size of not more than 0.2 μm. The photocatalyst permits quite efficient decomposition or destruction of gases or bacterial cells to be treated, can easily be adhered to faces to which the photocatalytic function is to be imparted to thus impart sterilization and/or deodorization functions thereto and can easily be fitted to various apparatuses to which a film has conventionally been applied with great difficulty. In particular, if the thickness of the metal substrate is not more than 1 mm, the photocatalyst can be processed by, for instance, cutting and/or bending so that it can be adhered to faces other than flat ones. Moreover, if the photocatalytic activity thereof is deteriorated due to, for instance, contamination, the used photocatalyst can easily be replaced with a fresh one.

7 Claims, 1 Drawing Sheet

F I G .1
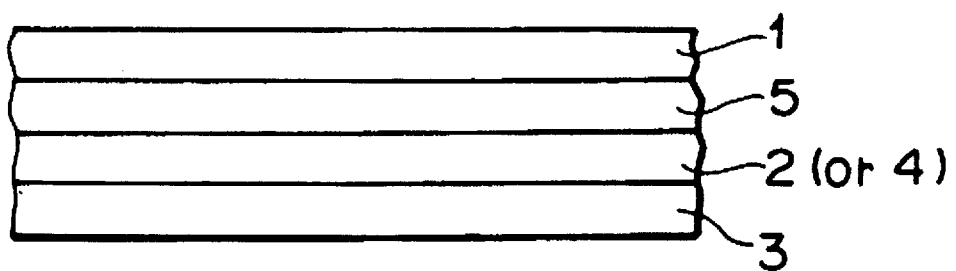
F I G .2
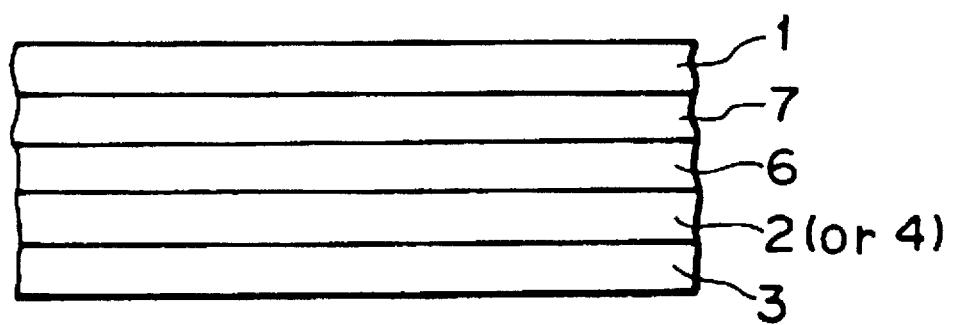

5,668,076

PHOTOCATALYST AND METHOD FOR PREPARING THE SAME

BACKGROUND OF THE INVENTION (a) Field of the Invention

The present invention relates to a photocatalyst and a method for preparing the photocatalyst and more particularly to a photocatalyst for use in sterilization, deodorization and prevention of contamination, while making use of the photocatalytic activity thereof.

(b) Description of the Prior Art

Titanium oxide and zinc oxide are semiconductor materials and there has thus been reported applications thereof as photocatalysts having photocatalytic activity. Semiconductor oxide particles are excited through absorption of light rays (in general, ultraviolet rays) having an energy greater than the band gap energy thereof, electrons and positive holes thus generated oxidize or reduce substances absorbed on the surface of the photocatalyst particles to thus decompose the substances through the electron-transfer between the electron and holes and the absorbed substances. Such activity of the semiconductor oxides is in general referred to as photocatalytic activity. The semiconductor oxide particles must directly come in contact with substances to be oxidized or reduced (molecules and ions) and must be irradiated with ultraviolet rays in order that the semiconductor oxide may exhibit this photocatalytic activity.

In fact, most of such photocatalysts consisting of semiconductor oxides are used in the form of fine powder, there has accordingly been used a method comprising the steps of dispersing the fine powder in a liquid such as water containing substances to be decomposed (such as molecules and/or ions) and then irradiating the dispersion with ultraviolet rays.

Alternatively, there has also been reported an attempt to perform sterilization, deodorization and prevention of contamination while making use of such a photocatalyst for the purpose of destroying or decomposing bacterial cells or gases present in a gas phase. In this case, however, it is necessary to suspend the fine particles of a semiconductor oxide having a high activity in the gas phase and then irradiate them with light rays, or to fix the semiconductor oxide fine particles on a substrate and then irradiate the particles with light rays. It is not practicable to yield the photocatalytic activity of semiconductor oxide fine particles while maintaining the suspended state of the particles in a gas phase from the viewpoint of difficulty in the recovery of the particles and installation required for carrying out the process.

There has been proposed a method in which semiconductor oxide fine particles are used after sintering or pressing them into a powder compact, but it is difficult to form a thin film-like compact, i.e., to reduce the weight thereof and therefore, the method is not practicable. In addition, a method in which semiconductor oxide fine particles are added to paint and varnish and then formed into a coated film would also be possible as a method for fixing semiconductor oxide fine particles having a photocatalytic activity on the surface of a substrate. However, the fine particles lose the photocatalytic activity since the surface thereof is covered with a resin present in the paint and varnish. On the other hand, there has been proposed a method for preparing a film of titanium oxide semiconductor fine particles which makes use of the sol-gel technique, but the sol-gel method requires the use of a heating step for the preparation of such a semiconductor oxide film. For this reason, the method is limited in the kinds of substrate used for forming a titanium oxide film and the production cost thereof is high. Japanese Un-examined Patent Publication No. Hei 3-8448 discloses a method for forming a titanium oxide film by a thermal spraying technique. However, when a zinc oxide film is formed by the thermal spraying technique, the film comprises particles of zinc oxide having a large particle size and accordingly, the activity of the film is low. Moreover, the formation of films through a sputtering or vapor deposition technique requires the use of a vacuum or a reduced pressure. Therefore, it is impossible to fix photocatalytic semiconductor oxide fine particles onto walls and/or ceilings presently used, by the sol-gel method or the sputtering or vapor-deposition technique. Moreover, there have been known only a small number of organic substances suitably used for preparing a uniform zinc oxide film by the sol-gel method and there has not yet been known any excellent method for fixing fine powder to substrates. For this reason, there has not been reported any specific example of such a photocatalyst film.

Heretofore, research workers of photocatalysts have mainly focused on titanium oxide. Then the inventors of this invention have conducted various studies and as a result, have found that zinc oxide has a photocatalytic activity comparable to that of titanium oxide and can easily be formed into films and that a film of zinc oxide is thus more practical, as a semiconductor oxide photocatalyst, than a titanium oxide film.

Moreover, the foregoing method which comprises adding semiconductor oxide fine particles having photocatalytic activity to paint and varnish and then formed into a film may be used for applying the semiconductor oxide fine particles onto, for instance, walls and/or ceilings of structures presently used or instruments to thus make the most use of the photocatalytic effect of the fine particles. In this case, however, the surface of the fine particles is covered with a resin component of the paint and varnish and accordingly, the particles would lose their photocatalytic activity. Under such circumstances, the semiconductor oxide fine particles having photocatalytic activity may be applied onto, for instance, walls and/or ceilings of structures or instruments by providing, for instance, paper, a film, a sheet or a plate to the surface of which the fine particles are fixed and then adhering it thereto.

SUMMARY OF THE INVENTION

Accordingly, it is an object of the present invention to provide a photocatalyst which permits the elimination of the foregoing drawbacks associated with the conventional techniques, in which zinc oxide in a highly active state is fixed onto the surface of a substrate in the form of a thin film and is free of any coating of, for instance, an inorganic or organic binder and which can easily and inexpensively be produced, as well as a method for preparing the photocatalyst.

Another object of the present invention is to provide a photocatalyst for pasting in which a layer of semiconductor oxide fine particles having high photocatalytic activity is present on or firmly fixed to the surface of a substrate such as paper, a film, a sheet or a plate, which has such a structure that it can easily be adhered to, for instance, walls and/or ceilings of buildings or instruments or which has a structure such that it can easily be adhered thereto by simply removing a release layer (release paper) and whose production cost is not high. The photocatalyst for pasting has high photocatalytic activity and therefore, can be used in wide variety of fields for sterilization, deodorization and prevention of contamination, represented by inner and outer walls and ceilings of various structures, deodorizing devices, sir cleaners and sterilizing devices.

The inventors of this invention have conducted various investigations to accomplish the foregoing objects, have found out that if anodically oxidizing a zinc metal plate or a zinc metal film, fine particles of zinc oxide are deposited thereon to thus give a film thereof and that the resulting zinc oxide film consisting of the zinc oxide fine particles has a large specific surface area and high photocatalytic activity and thus have completed the present invention.

The photocatalyst according to the present invention is characterized in that it has, on the surface, a zinc oxide film comprising zinc oxide fine particles formed by anodic oxidation of zinc and having a particle size of not more than 0.2 μm and comprises, for instance, a zinc metal substrate or a substrate comprising zinc metal as a principal component and a zinc oxide film comprising zinc oxide fine particles formed, on the surface of the substrate, by anodic oxidation of zinc and having a particle size of not more than 0.2 μm; or a substrate, a zinc metal layer or a layer comprising zinc metal as a principal component formed on the surface of the substrate and a zinc oxide film comprising zinc oxide fine particles formed, on the surface of the layer, by anodic oxidation of zinc and having a particle size of not more than 0.2 μm.

In addition, the method for preparing the photocatalyst is characterized by anodically oxidizing the surface of zinc metal or a layer mainly comprising zinc metal to form, on the surface, a zinc oxide film comprising zinc oxide fine particles having a particle size of not more than 0.2 μm and comprises the steps of, for instance, anodizing the surface of a zinc metal substrate or a substrate mainly comprising zinc metal to form, on the surface of the substrate, a zinc oxide film which comprises zinc oxide fine particles having a particle size of not more than 0.2 μm; or applying a zinc metal layer or a layer comprising zinc metal as a principal component on the surface of the substrate and then anodizing the surface of the layer to form, on the surface of the layer, a zinc oxide film which comprises zinc oxide fine particles having a particle size of not more than 0.2 μm.

Moreover, the inventors of this invention have further conducted various investigations to achieve the foregoing objects, have found out that if a photocatalyst has a structure which comprises a layer of zinc oxide fine particles, an adhesive layer (or a layer of a double-sided adhesive tape) and a release layer (a layer of release paper), there can be prepared a photocatalyst capable of adhering to places or faces to which any conventional photocatalyst has not been able to be adhered, and have completed the present invention.

Accordingly, the photocatalyst for pasting comprises a zinc oxide film comprising zinc oxide fine particles formed by anodic oxidation of zinc and having a particle size of not more than 0.2 μm, a substrate layer of zinc metal or mainly comprising zinc metal arranged on the inner side of the zinc oxide film, an adhesive layer arranged on the other side of the substrate layer and a release layer present on the adhesive layer; or a zinc oxide film comprising zinc oxide fine particles formed by anodic oxidation of zinc and having a particle size of not more than 0.2 μm, a zinc metal layer or a layer mainly comprising zinc metal arranged on the inner side of the zinc oxide film, a substrate layer positioned on the other side of the layer of zinc metal or mainly comprising zinc metal, an adhesive layer arranged on the other side of the substrate layer and a release layer present on the adhesive layer.

BRIEF DESCRIPTION OF THE DRAWINGS

FIG. 1 is a cross sectional view of the photocatalyst prepared in Example 6 of the present invention and FIG. 2 is a cross sectional view of the photocatalyst prepared in Example 8 of the present invention.

DESCRIPTION OF THE PREFERRED EMBODIMENTS

The term "zinc metal substrate or substrate mainly comprising zinc metal" herein used means, for instance, zinc plates, mesh-like bodies of zinc, zinc foils, zinc wires, plates of zinc alloys mainly comprising zinc, and mesh-like bodies, foils and wires of zinc alloys. In addition, the term "zinc metal layer or layer mainly comprising zinc metal" used herein means zinc metal film layers or film layers mainly comprising zinc metal (consisting of zinc alloys) which are applied onto the surface of, for instance, variously shaped metals, insulating materials and carbon fibers through, for instance, plating, vapor-deposition, thermal spraying and sputtering techniques and examples thereof are zinc-plated plates represented by galvanized iron. The zinc-plating can easily be carried out and is, accordingly, used in wide variety of fields. Examples of plating methods include not only hot zinc dipping methods, but also electro-plating methods. Moreover, it is also possible to fix such a film to a substrate by physically or chemically applying a zinc metal film onto an insulating material such as resins, glass and cloths in addition to metals. The foregoing methods for physically or chemically applying a zinc metal film or a film mainly comprising zinc metal may be, for instance, vapor-deposition, sputtering, thermal spraying and electroless plating techniques.

The present invention includes the step for anodically oxidizing the surface of the foregoing "zinc metal substrate or substrate mainly comprising zinc metal" or "zinc metal layer or layer mainly comprising zinc metal". The anodic oxidation may be carried out under the conditions currently used in the anodic oxidation of zinc. If the surface of zinc or the surface of a substance mainly comprising zinc is treated by anodic oxidation, a part of zinc is dissolved out from the surface, the zinc dissolved out is converted into fine particles of zinc oxide and deposited on the surface thereof to thus give a zinc oxide film.

The zinc oxide produced by the anodic oxidation is in general fine particles having a particle size of not more than 0.2 μm, in particular not more than 0.1 μm. In other words, the fine particles have a particle size which permits efficient irradiation with ultraviolet rays and have a large specific surface area. Moreover, the anodically formed zinc oxide layer or film has a structure which permits free penetration or transfer of molecules or bacterial cells to be destroyed or decomposed and therefore, ensures adsorption of a large amount of gases to be treated. Moreover, the anodically formed zinc oxide film is free of any inorganic or organic binder and hence free of any coating thereof and accordingly, permits quite efficient decomposition of the gases to be treated. The activity of the zinc oxide photocatalyst of the present invention is based on the fineness of the particles and is, therefore, higher than that observed when zinc oxide powder currently used is spread on the same surface area of a substrate and then the activity thereof is determined under the same conditions.

The photocatalyst of the present invention can be obtained by simply anodically oxidizing the surface of a cheap material such as a zinc plate or a zinc-plated plate, can be used at various places and is suitable for applying to s large area. For instance, the photocatalyst of the present invention can be used in a wide variety of applications represented by wall surfaces of various structures, bath rooms and kitchens for the purposes of sterilization, deodorization and prevention of contamination due to the photocatalytic activity thereof. Moreover, a combination of zinc-plated metal meshes anodized or pipes whose inner walls are anodized, with a light source emitting ultraviolet rays permits sterilization of exhaust ports and running water and decomposition of organic substances. In addition, zinc oxide per se exhibits sterilization activity and accordingly, the effect of sterilization and decomposition can be expected even when light rays are not irradiated.

The ultraviolet rays used when the photocatalyst is put in use may be not only light rays emitted from pasteurization lamps and mercury lamps, but also those emitted from light sources which can emit light including light rays having an energy equal to or greater than that of the light of 380 nm wavelength which corresponds to the band-gap energy of zinc oxide. For instance, light rays emitted from fluorescent lamps and solar light rays may induce the photocatalytic activity of the photocatalyst.

To efficiently induce the photocatalytic activity, it is in general required that the photocatalyst must have a large specific surface area sufficient for adsorbing gases to be treated; that it has a particle size which permits effective irradiation with ultraviolet rays, in other words, effective irradiation with ultraviolet rays can be ensured if the photocatalyst has a particle size of not more than ½ time, desirably not more than ¼ time the wavelength of the irradiated light, or a particle size of not more than 0.2 μm, desirably not more than 0.1 μm; and that the surface of the photocatalyst is not covered with a substance which inhibits the photoreaction of the photocatalyst such as inorganic or organic binders so as to ensure the electron-transfer between the photocatalyst and the gases to be treated. The photocatalyst of the present invention satisfies all of the foregoing requirements.

The anodized zinc oxide film is formed through deposition of zinc oxide fine particles and thus the oxide film is so strong that it cannot be peeled off or removed even if rubbing it with a hand or bending the metal substrate.

The photocatalyst for pasting according to the first embodiment of the present invention comprises a zinc oxide film comprising zinc oxide fine particles formed by anodic oxidation of zinc and having a particle size of not more than 0.2 μm; a substrate layer of zinc metal or mainly comprising zinc metal arranged on the inner side of the zinc oxide film; an adhesive layer arranged on the other side of the substrate layer; and a release layer present on the adhesive layer. As seen from FIG. 1, the photocatalyst for pasting according to this embodiment can be produced by, for instance, anodically oxidizing one of the surfaces of the substrate layer 5 of zinc metal or mainly comprising zinc metal to form a film (layer 1 of semiconductor zinc oxide fine particles) comprising fine particles of zinc oxide; then coating the other surface of the substrate layer 5 with an adhesive to give an adhesive layer 4 or adhering a pressure sensitive adhesive double coated tape 2 to the other surface; and further applying a release layer 3 onto the adhesive layer 4 or the pressure sensitive adhesive double costed tape 2.

The photocatalyst for pasting according to the present invention may have s plate-like, foil-like or tape-like shape, but may be any shape depending on surfaces to which the photocatalyst for pasting is applied. In the present invention, the term "adhesive layer" includes layers of pressure sensitive adhesive double coated tapes in addition to a variety of adhesive layers. Moreover, the term "release layer" used in the present invention means a layer capable of being peeled off or removed to thus expose the adhesive layer and specific examples thereof are paper and films, but it is not restricted to these specific examples and may be any materials so far as they can be peeled off. The photocatalyst for pasting prepared by the foregoing production methods can be used in various applications while properly selecting on the basis of various properties which vary depending on the thickness of the substrate layer, such as pliability and rigidity. In particular, the photocatalyst can have excellent pliability if the thickness of the substrate layer is reduced to a level of not more than 1 mm. Therefore, it can be arbitrarily be adhered to various surfaces such as curved surfaces and uneven surfaces after peeling off the release layer. Moreover, the photocatalyst can be processed, by for instance, cutting and/or bending so that it can be adhered to faces other than flat ones, unlike the sintered plates such as tiles and the weight thereof can likewise be reduced.

The photocatalyst for pasting according to the second embodiment of the present invention comprises a zinc oxide film comprising zinc oxide fine particles formed by anodic oxidation of zinc and having a particle size of not more than 0.2 μm; a zinc metal layer or a layer mainly comprising zinc metal arranged on the inner side of the zinc oxide film; a substrate layer positioned on the other side of the layer of zinc metal or mainly comprising zinc metal; an adhesive layer arranged on the other side of the substrate layer; and a release layer present on the adhesive layer. As seen from FIG. 2, the photocatalyst for pasting according to this embodiment can be produced by, for instance, forming a layer 7 of zinc metal or mainly comprising zinc metal on the surface of a substrate layer 6; anodically oxidizing the surface of the layer 7 to form a film (layer 1 semiconductor zinc oxide fine particles) comprising fine particles of zinc oxide; then coating the other surface of the substrate layer 6 with an adhesive to give an adhesive layer 4 or adhering a pressure sensitive adhesive double coated tape 2 to the other surface; and further applying a release layer 3 onto the adhesive layer 4 or the pressure sensitive adhesive double coated tape 2.

The photocatalyst for pasting prepared by the foregoing production methods can be used in various applications while properly selecting on the basis of various properties of the substrate such as pliability, flexibility, rigidity and strength.

The present invention will hereunder be described in more detail with reference to the following non-limitative working Examples and Comparative Examples.

EXAMPLE 1

A degreased and washed zinc plate (10 cm×10 cm, thickness 1 mm, the back face was covered with a vinyl tape) was anodically oxidized by immersing the zinc plate in an electrolytic solution comprising 20 g of sodium hydroxide, 10 g of sodium nitrate and one liter of water, setting the distance between the zinc plate serving as an anode and a stainless steel plate (10 cm×10 cm) serving as a cathode at 10 cm and then applying a DC voltage of 10 V for 10 minutes. Thereafter, the zinc plate was washed and dried to give a zinc plate provided thereon with a zinc oxide film. The surface of the zinc oxide film-carrying plate had a black color and it was confirmed that the zinc oxide film thus formed was composed of fine particles (average particle size: less than 50 nm) of zinc oxide, by X-ray diffraction analysis and transmission electron microscopic observation. Moreover, the thickness of the film was found to be about 3 μm.

The resulting zinc oxide film-carrying plate was inspected for the photocatalytic activity. The photocatalytic activity was determined by placing the zinc oxide film-carrying plate within a sealed glass container (10 l volume) in which a gas to be decomposed had been enclosed, then irradiating the zinc oxide film-carrying plate with ultraviolet rays (emitted from Black Light 10 W×5 lamps) to thus decompose the gas and determining the amount of the gas decomposed by gas chromatography. The gas to be treated which was used in this measurement was acetaldehyde. This compound is currently used as an indication of the ability of the photocatalyst to decompose or destroy bacterial cells or organic substances. Therefore, the results thus obtained correspond to the sterilization and/or deodorization ability of the photocatalyst examined. Acetaldehyde gas was introduced into the glass container such that the concentration thereof was equal to 50 ppm and then the irradiation with ultraviolet rays was initiated. As a result, it was confirmed that the gas was decomposed by the photocatalyst to such an extent that the concentration of acetaldehyde gas could be reduced to 2 ppm after 40 minutes. Then acetaldehyde gas was freshly introduced into the glass container till the concentration thereof reached 50 ppm and the same procedures used above were repeated to decompose the gas and it was found that the decomposition rate was completely the same as that observed above. The same operations were repeated 4 times, but there was not observed any change in the decomposition rate.

EXAMPLE 2

A plate (10 cm×10 cm) obtained by hot-dipping an iron plate with zinc, which served as an anode, and the electrolytic solution and the cathode plate of stainless steel used in Example 1 were used to anodize the plate by applying a DC voltage of 10 V for 5 minutes while setting the distance between the anode and the cathode at 10 cm. The surface of the resulting zinc oxide film had a black color and high strength like the film prepared in Example 1. The resulting zinc oxide film-carrying plate was used in a test for decomposing acetaldehyde which was carried out under the same conditions used in Example 1. As a result, it was found that the photocatalyst could reduce the amount of acetaldehyde (initial concentration: 50 ppm) to 5 ppm after 60 minutes.

EXAMPLE 3

An iron mesh (10 cm×10 cm; wire diameter: 1 mm; mesh size: 3 mm) was plated with zinc by hot dipping. The zinc-plated iron mesh, which served as an anode, and the electrolytic solution and the cathode plate of stainless steel used in Example 1 were used to anodize the iron mesh by applying a DC voltage of 10 V for 10 minutes while setting the distance between the anode and the cathode at 10 cm to thus give an iron mesh provided with a zinc oxide film of a black color formed through deposition of zinc oxide fine particles. The resulting zinc oxide film-carrying mesh was used in an acetaldehyde-decomposition test which was carried out under the same conditions used in Example 1. As a result, it was found that the acetaldehyde was decomposed due to the photocatalytic effect of the photocatalyst and that the amount of acetaldehyde (initial concentration: 50 ppm) could be reduced to 10 ppm after 80 minutes.

EXAMPLE 4

A zinc metal film was applied onto the surface of a cotton cloth (10 cm×10 cm) by argon thermal-spraying of zinc metal powder (average particle size 65 μm). The thickness of the film was found to be about 0.5 mm. The cotton cloth was not damaged (such as burning) at all by the thermal spraying treatment. The zinc metal film-carrying cotton cloth, which served as an anode, and the electrolytic solution and the cathode plate of stainless steel used in Example 1 were used to anodize the cotton cloth by applying a DC voltage of 10 V for 5 minutes while setting the distance between the anode and the cathode at 10 cm. The resulting zinc oxide film-carrying cotton cloth was used in an acetaldehyde (initial concentration: 50 ppm)-decomposition test which was carried out under the same conditions used in Example 1. As a result, the acetaldehyde was decomposed as it was irradiated with ultraviolet rays and the concentration thereof was reduced to 10 ppm after 90 minutes.

EXAMPLE 5

Zinc metal (20 g) was introduced into an alumina crucible (inner diameter 5 cm×height 15 cm) and the crucible was covered with a graphite lid provided with a hole having a diameter of 1 cm. A hole having a diameter of 1 cm was made in the wall of the crucible at a position 2 cm apart from the upper end thereof, an alumina tube having an outer diameter of 1 cm was inserted into the hole of the crucible to introduce nitrogen gas into the crucible. The alumina crucible was placed on a mantle heater (inner diameter: 18 cm; depth: 12 cm) and heated to about 900 ° C. Zinc metal vapor was generated through the hole of the graphite lid. A zinc metal film was applied onto the surface of an alumina plate (5 cm×5 cm) by placing the alumina plate just above the graphite lid. The resulting zinc metal film-carrying alumina plate serving as an anode, and the electrolytic solution and the cathode plate of stainless steel used in Example 1 were used to anodize the alumina plate by applying a DC voltage of 5 V for one minute while setting the distance between the anode and the cathode at 10 cm. The resulting zinc oxide film-carrying alumina plate was inspected for the photocatalytic activity under the same conditions used in Example 1. As a result, the acetaldehyde (initial concentration: 50 ppm) was decomposed as the alumina plate was irradiated with ultraviolet rays and the concentration thereof was reduced to 5 ppm after 120 minutes.

COMPARATIVE EXAMPLE 1

Commercially available zinc oxide powder (particle size: 0.5 μm; specific surface area: 19.5 m²/g) was spread on a glass container (10 cm×10 cm) and the photocatalytic activity thereof was determined under the same conditions used in Example 1. As a result, it was found that acetaldehyde (initial concentration 50 ppm) was reduced to 10 ppm at an instance of 100 minutes after the initiation of ultraviolet irradiation.

COMPARATIVE EXAMPLE 2

To a polyethylene container, there were added 6 g of commercially available zinc oxide powder (particle size: 0.15 μm; specific surface area: 19.5 m₂/g), 5 g of a polyester resin (trade name: Dynapol) dissolved in an organic solvent, 10 g of a mixed solvent (trade name: Solvesso 200) and 50 g of zirconia beads (diameter 1.5 mm), followed by mixing for 15 minutes in a paint blender to give a dispersion. Then the resulting resin mixture was applied onto a plastic resin plate with an applicator coater and thereafter the resin was dried. The thickness of the resin and the surface area thereof as determined after the application were found to be 50 μm and 96 cm² respectively. The resulting product was inspected for the photocatalytic activity using acetaldehyde under the same conditions used in Example 1, but it was found that the gas was not decomposed at all.

EXAMPLE 6

A degreased and washed zinc foil (10 cm×10 cm, thickness 0.1 mm, the back face was covered with a vinyl tape) was anodically oxidized by immersing the zinc foil in an electrolytic solution (comprising 20 g of sodium hydroxide, 10 g of sodium nitrate and one liter of water), setting the distance between the zinc foil serving as an anode and a stainless steel plate (10 cm×10 cm) serving as a cathode at 10 cm and then applying a DC voltage of 10 V for 10 minutes. Thereafter, the zinc foil was washed and dried to give a zinc foil provided thereon with a zinc oxide film. It was confirmed that the zinc oxide film thus formed was composed of fine particles (average particle size: less than 50 nm) of zinc oxide, by X-ray diffraction analysis and transmission electron microscopic observation. Moreover, the thickness of the film was found to be about 3 μm.

After peeling off the vinyl tape from the back face of the resulting zinc oxide film-carrying foil, a pressure sensitive adhesive double coated tape provided with a release paper was adhered to the back face. In other words, the photocatalyst comprises a semiconductor oxide fine particle layer, a substrate layer of zinc metal or mainly comprising zinc metal, a pressure sensitive adhesive double coated tape layer (adhesive layer) and a release layer. The photocatalyst is formed from a thin foil and therefore, can be bent. For instance, the oxide film was not peeled off even when the photocatalyst was bent into an arc having s radius of 1 cm.

EXAMPLE 7

A plate (10 cm×10 cm, thickness 0.3 mm, the back face was covered with a vinyl tape) obtained by plating an iron plate with zinc through hot dipping was anodically oxidized by immersing the plate in an electrolytic solution (comprising 8 g of sodium hydroxide, 17 g of sodium carbonate and one liter of water), setting the distance between the plate serving as an anode and a stainless steel plate (10 cm×10 cm) serving as a cathode at 10 cm and then applying a DC voltage of 20 V for 20 minutes. Thereafter, the anodized plate was washed and dried to give a plate provided thereon with a zinc oxide film. After peeling off the vinyl tape from the back face of the resulting zinc oxide film-carrying plate, an acrylic adhesive was applied onto the back face, followed by drying and adhering a release film provided with a silicone film to the adhesive layer. The resulting plate could easily and firmly be adhered to a flat face after peeling off the release film.

EXAMPLE 8

A zinc metal film was applied onto the surface of a cotton cloth (10 cm×10 cm) by argon thermal-spraying of zinc metal powder (average particle size 65 μm). The thickness of the film was found to be about 0.5 mm. The cotton cloth was not damaged (such as burning) at all by the thermal spraying treatment. The zinc metal film-carrying cotton cloth, which served as an anode, and the electrolytic solution and the cathode plate of stainless steel used in Example 1 were used to anodize the cotton cloth by applying a DC voltage of 10 V for 5 minutes while setting the distance between the anode and the cathode at 10 cm. After an acrylic adhesive was applied onto the back face of the resulting zinc oxide film-carrying cotton cloth and dried, a release film provided with a silicone film was pasted to the adhesive layer. The resulting cotton cloth could easily and firmly be adhered to a flat face after peeling off the release film.

EXAMPLE 9

The zinc oxide film-carrying foil prepared in Example 6 was inspected for the function as a photocatalyst. The ability was determined by adhering the zinc oxide film-carrying foil (10 cm×10 cm; 6 sheets of the foils) to the inner side wall of a cylindrical glass container (10 l volume), covering the container with a flat glass plate to establishing a closed system within the container and enclosing a gas to be treated within the closed system. Then the closed system containing the gas was irradiated with ultraviolet rays (Black Light 10 W×5 lamps) from the upper outer side of the container and the amount of the gas decomposed was determined by gas chromatography. The gas to be treated which was used in this measurement was acetaldehyde. This compound is currently used as an indication of the ability of the photocatalyst to decompose or destroy bacterial cells or organic substances. Therefore, the results thus obtained correspond to the sterilization and/or deodorization ability of the photocatalyst examined. The acetaldehyde gas was introduced into the glass container such that the concentration thereof was equal to 50 ppm and then the irradiation with ultraviolet rays was initiated. As a result, it was confirmed that the gas was decomposed by the photocatalyst to such an extent that the concentration of the acetaldehyde gas could be reduced to 1 ppm after 20 minutes.

As has been described above in detail, the photocatalyst of the present invention has a particle size which permits efficient ultraviolet-irradiation and also has a large specific surface area. Moreover, the photocatalyst has a structure which allows free transfer of molecules and/or bacterial cells to be decomposed or destroyed and therefore, can adsorb a large amount of gases to be treated. The photocatalyst is free of any inorganic or organic binder and thus the zinc oxide is not covered with such a binder. This permits quite efficient decomposition of gases to be treated.

Moreover, the photocatalyst of the present invention has a dense and strong film fixed to the substrate thereof and an adhesive face capable of being adhered to other faces. Therefore, the photocatalyst can easily be pasted, after peeling off the release layer, to faces to which the photocatalytic function is to be imparted such as outer and inner walls and ceilings of the existing structures as well as various apparatuses after assembly to thus impart sterilization and/or deodorization functions thereto. Moreover, the photocatalyst can easily be fitted to various apparatuses to which a film has been applied with great difficulty, represented by outer and inner walls of structures, deodorizing devices, air cleaners and sterilizing devices. In particular, if the thickness of the metal plate is reduced to a level of not more than 1 mm, the photocatalyst can be processed by, for instance, cutting and/or bending so that it can be adhered to faces other than flat ones, unlike the sintered plates such as tiles. Moreover, if the photocatalyst of the present invention is used over a lone time period and the photocatalytic activity thereof is deteriorated due to, for instance, contamination, the used photocatalyst can be replaced with a fresh one since it can be removed through peeling.

What is claimed is:

1. A photocatalyst comprising a zinc metal substrate or a substrate comprising zinc metal as a principal component and a zinc oxide film which comprises zinc oxide fine particles formed, on the surface of the substrate, by anodic oxidation of zinc and having a particle size of not more than 0.2 μm.

2. A photocatalyst comprising a substrate, a zinc metal layer or a layer comprising zinc metal as a principal component formed on the surface of the substrate and a zinc oxide film which comprises zinc oxide fine particles formed, on the surface of the layer, by anodic oxidation of zinc and having a particle size of not more than 0.2 μm.

3. A method for preparing a photocatalyst comprising the step of anodically oxidizing the surface of a substance of zinc metal or mainly comprising zinc metal to form, on the surface, a zinc oxide film which comprises zinc oxide fine particles having a particle size of not more than 0.2 μm.

4. A method for preparing a photocatalyst comprising the step of anodizing the surface of a zinc metal substrate or a substrate mainly comprising zinc metal to form, on the surface, a zinc oxide film which comprises zinc oxide fine particles having a particle size of not more than 0.2 μm.

5. A method for preparing a photocatalyst comprising the steps of applying a zinc metal layer or a layer comprising zinc metal as a principal component on the surface of a substrate and then anodizing the surface of the layer to form, on the surface of the layer, a zinc oxide film which comprises zinc oxide fine particles having a particle size of not more than 0.2 μm.

6. A photocatalyst for pasting comprising a zinc oxide layer which comprises zinc oxide fine particles formed by anodic oxidation of zinc and having a particle size of not more than 0.2 μm, a substrate layer of zinc metal or mainly comprising zinc metal arranged on the inner side of the zinc oxide layer, an adhesive layer arranged on the other side of the substrate layer and a release layer present on the adhesive layer.

7. A photocatalyst for pasting comprising a zinc oxide layer which comprises zinc oxide fine particles formed by anodic oxidation of zinc and having a particle size of not more than 0.2 μm, a zinc metal layer or a layer mainly comprising zinc metal arranged on the inner side of the zinc oxide layer, a substrate layer positioned on the other side of the layer of zinc metal or mainly comprising zinc metal, an adhesive layer arranged on the other side of the substrate layer and a release layer present on the adhesive layer.

* * * * *